United States Patent [19]

Clegg

[11] Patent Number: 4,556,294

[45] Date of Patent: Dec. 3, 1985

[54] HEXAGONAL CONICAL BEAM CONCENTRATOR

[76] Inventor: John E. Clegg, 2320 Keystone Dr., Orlando, Fla. 32806

[21] Appl. No.: 660,688

[22] Filed: Oct. 15, 1984

[51] Int. Cl.$^4$ ............................. F24J 3/02; G02B 3/04
[52] U.S. Cl. .................................... 350/432; 350/451; 126/440
[58] Field of Search ............ 350/432, 433–435, 350/451; 126/440

[56] References Cited

U.S. PATENT DOCUMENTS

| | | | |
|---|---|---|---|
| 2,881,654 | 4/1959 | Toffolo | 350/432 |
| 2,882,784 | 4/1959 | Toffolo | 350/432 |
| 3,493,291 | 2/1970 | Webb | 126/440 |
| 3,998,204 | 12/1976 | Fuchs et al. | 126/440 |
| 4,057,048 | 11/1977 | Maine | 126/440 |
| 4,277,148 | 7/1981 | Clegg | 350/432 |
| 4,325,612 | 4/1982 | Clegg | 350/432 |
| 4,333,713 | 6/1982 | Clegg | 350/432 |

Primary Examiner—John K. Corbin
Assistant Examiner—Scott J. Sugarman

[57] ABSTRACT

A conical stage lens which receives a convergent conical beam of diffused sunlight and emits a concentrated circular whole beam. The lens is mounted on a tapered hexagonal base which allows the lenses to be mounted side by side to form a sphere. The concentrated beams are projected onto a heating element at the center of the sphere.

1 Claim, 2 Drawing Figures

HEXAGONAL CONICAL BEAM CONCENTRATOR

BACKGROUND

The code designation of the concentrator is RT:C (R—refracting section of a stage lens, T—transmitting section of a stage lens, and C—concentrating stage lens).

Prior art includes the Conical Refractor, U.S. Pat. No. 2,882,784, 4/21/84, by D. S. Toffolo. This lens is similar in shape, but it is designed to receive an annular beam and emit a concentrated circular whole beam. It cannot produce a concentrated circular whole beam from a convergent conical beam because its convex and concave sections are parallel.

DRAWINGS

DESCRIPTION

Figure 1:
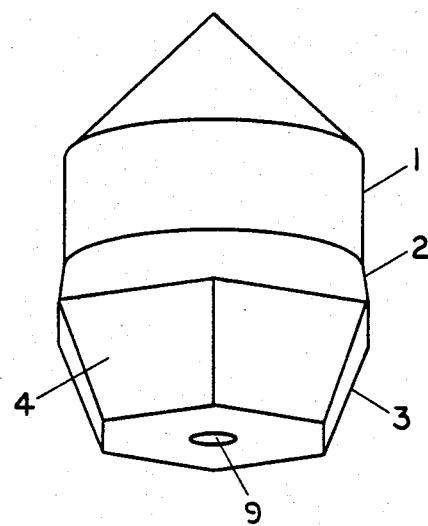
FIG. 1 is a perspective view of the hexagonal conical beam concentrator.

FIG. 1 shows the hexagonal conical beam contentrator RT:C with conical stage lens RT 1, intermediate adjoining section 2 and hexagonal base 3. Section 2 and base 3 are structural members composed of metal, heat-resistant plastic or opaque glass.

Hexagonal base 3 is a solid with three pairs of opposed equidimensional sides 4 tapered inward at equal angles toward the central axis of the hexagon. The projected planes of the sides intersect the axis at a common point.

Figure 2:
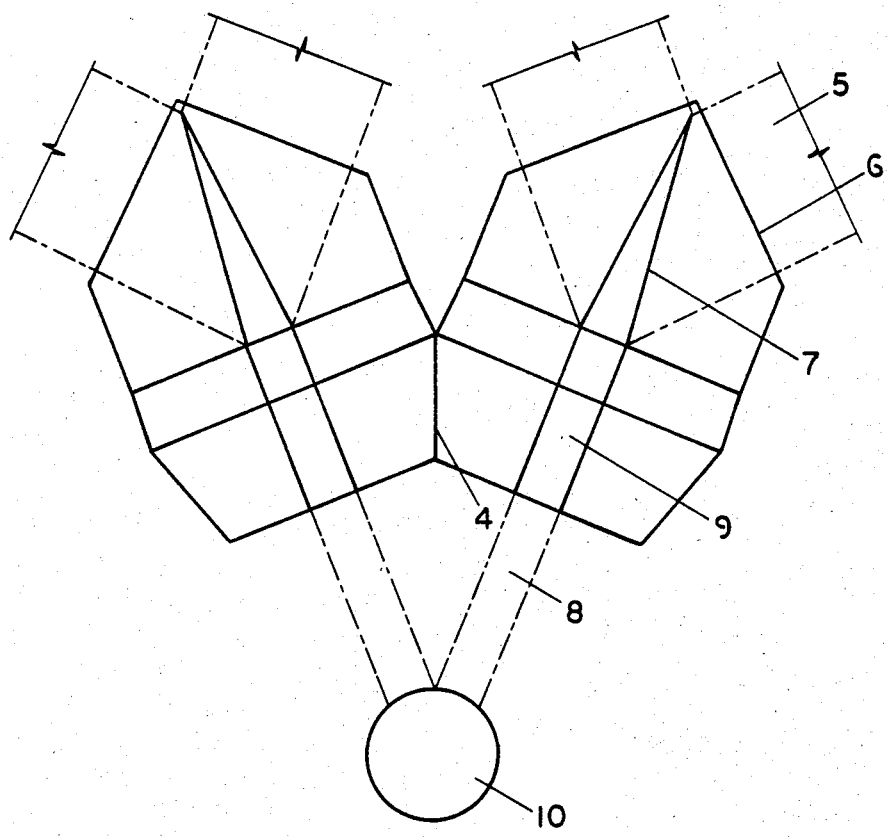
FIG. 2 is an elevation of two concentrators mounted side by side with the concentrated beams projected onto a spherical heating element.

FIG. 2 shows the two concentrators mounted side by side with two sides 4 of hexagonal bases 3 in contact. Additional concentrators can be mounted to the right and left and front and rear of the concentrators shown to form a dome similar to the geodesic dome. If the concentrators are mounted above water or a reflective surface, a sphere can be formed to receive radiation from above and below the concentrators.

FIG. 2 shows the concentrators with a ray diagram. Convergent conical incipient beam 5 of diffused sunlight is received and transmitted by convex conical section 6 and refracted by concave conical section 7, forming concentrated circular whole beam 8 which is projected through hole 9 in adjoining section 2 and hexagonal base 3 to a spherical heating element 10 mounted below the concentrators.

I claim:

1. A hexagonal conical beam concentrator RT:C comprising;
    a. A conical stage lens RT (1) with a convex conical section (6) and a concave conical section (7),
    b. A hexagonal base (3) comprising a solid with three pairs of opposed equidimensional sides (4) disposed at equal angles toward the central axis of hexagon formed by the solid, with the projected planes of the sides (4) converging so as to intersect the axis at a common point, and
    c. An intermediate adjoining section (2) comprising a solid mounted between conical stage lens RT (1) and hexagonal base (3).

* * * * *